United States Patent
Redfern et al.

(10) Patent No.: US 8,392,422 B2
(45) Date of Patent: Mar. 5, 2013

(54) AUTOMATED BOOLEAN EXPRESSION GENERATION FOR COMPUTERIZED SEARCH AND INDEXING

(76) Inventors: Darren Redfern, Stratford (CA); Chad Thomas Ternent, Kitchener (CA)

( * ) Notice: Subject to any disclaimer, the term of this patent is extended or adjusted under 35 U.S.C. 154(b) by 328 days.

(21) Appl. No.: 12/558,001

(22) Filed: Sep. 11, 2009

(65) Prior Publication Data

US 2011/0066620 A1 Mar. 17, 2011

(51) Int. Cl.
G06F 7/00 (2006.01)
G06F 17/30 (2006.01)

(52) U.S. Cl. ........................................ 707/741; 707/810

(58) Field of Classification Search .................. 707/741, 707/E17.076, 810, 737, 748, 750, 767, E17.064, 707/E17.071, E17.084
See application file for complete search history.

(56) References Cited

U.S. PATENT DOCUMENTS

| | | | |
|---|---|---|---|
| 5,175,814 A | 12/1992 | Anick et al. | |
| 6,028,601 A | 2/2000 | Machiraju et al. | |
| 6,341,277 B1 | 1/2002 | Coden et al. | |
| 6,363,373 B1 | 3/2002 | Steinkraus | |
| 6,531,888 B2 * | 3/2003 | Abbott ............................ | 326/38 |
| 6,571,239 B1 | 5/2003 | Cole et al. | |
| 6,665,666 B1 | 12/2003 | Brown et al. | |
| 6,732,094 B1 * | 5/2004 | Cousins et al. ........ | 707/999.003 |
| 7,058,564 B2 | 6/2006 | Ejerhed | |
| 7,171,409 B2 * | 1/2007 | Craig et al. ................... | 707/711 |
| 7,716,229 B1 * | 5/2010 | Srivastava et al. ............ | 707/749 |
| 2002/0123994 A1 * | 9/2002 | Schabes et al. .................. | 707/5 |
| 2002/0177991 A1 * | 11/2002 | Ejerhed .............................. | 704/2 |
| 2003/0097357 A1 * | 5/2003 | Ferrari et al. ...................... | 707/3 |
| 2003/0145001 A1 * | 7/2003 | Craig et al. ........................ | 707/5 |
| 2004/0111410 A1 * | 6/2004 | Burgoon et al. .................... | 707/4 |
| 2006/0242025 A1 * | 10/2006 | Nishihara et al. ................ | 705/15 |
| 2009/0216696 A1 * | 8/2009 | Downs et al. ................... | 706/20 |
| 2010/0257507 A1 * | 10/2010 | Warren ......................... | 717/106 |
| 2011/0066620 A1 * | 3/2011 | Redfern et al. ............... | 707/741 |

OTHER PUBLICATIONS

A. Correa, C. Werner and M. Barros—"Refactoring to improve the understandability of specifications written in object constraint language"—The Institution of Engineering and Technology 2009—IET Softw., 2009, vol. 3, Iss. 2, pp. 69-90.*

Steve Jones, Shona McInnes and Mark S. Staveley—"Agraphical user interface for Boolean query specication"—Interface and evaluation International Journal on Digital Libraries vol. 2, Nos. 2-3 (1999), Received: Dec. 15, 1997=Revised: Jun. 1999, (pp. 207-223).*

* cited by examiner

Primary Examiner — Anh Ly
(74) Attorney, Agent, or Firm — Smart & Biggar

(57) ABSTRACT

A computer implemented method of indexing a plurality of responses for later retrieval and presentation to a user in response to queries, includes, for each of the plurality of responses, receiving at least one representative query for that response. The representative query(s) represent text (e.g. natural language) query(s) to be input by an end user searching for information addressed by that response. Each representative query is parsed into terms. The terms are analyzed to determine which of these terms are more likely to uniquely identify queries for the particular response among terms in representative queries for all indexed responses. Boolean expression(s) satisfied by a text query containing one of the terms determined to more likely uniquely identify that response, and another one of the parsed terms are formed.

17 Claims, 11 Drawing Sheets

AUTOMATED BOOLEAN EXPRESSION GENERATION FOR COMPUTERIZED SEARCH AND INDEXING

FIELD OF THE INVENTION

The present invention relates to the indexing of information, and more particularly to a method, software and device for searching and retrieving information using a computer, and for generating Boolean expressions used to index the information.

BACKGROUND OF THE INVENTION

U.S. Pat. No. 7,171,409, the contents of which are hereby incorporated by reference, discloses an information search and indexing method in which information is organized as a plurality of responses to possible queries. The collection of responses may be thought of as an information base. For each response in the information base, a Boolean expression that may be applied to possible queries searching for that response is formulated and stored. When a query is received, stored Boolean expressions for the multiple responses in the information base are applied to the query. Responses associated with the expressions that are wholly or partially satisfied by the query may be presented to an information seeker.

As disclosed in the '409 patent, each Boolean expression needs to be carefully formulated so that a query for an associated response satisfies the expression, without unnecessarily satisfying Boolean expressions associated with other responses.

In this way, and in contrast to conventional query and indexing methods, the actual contents of responses and the expected queries for these responses may be entirely independent.

Designing a collection of Boolean expressions for the plurality of responses is challenging. Each Boolean expression should only be satisfied by an expected queries for the response associated with the expression. The difficulty is compounded as new responses are added to an existing collection of responses.

Generally, the more responses that form part of the information base, the more difficult the formulation of new Boolean expressions becomes. Typically, Boolean expressions are formed manually, by skilled programmers or analysts. Unfortunately, so forming Boolean expressions is time consuming, and requires special skills and understanding in the formation of such expressions.

Accordingly, there remains a need to be able to improve the accuracy of the Boolean expressions and the returned responses.

SUMMARY OF THE INVENTION

In accordance with an aspect of the present invention, there is provided a computer implemented method of indexing a plurality of responses for later retrieval and presentation to a user in response to queries. The method comprises: storing the plurality of responses, for each of the plurality of responses receiving at least one representative query for that response, the at least one representative query representing a query to be input by an end user searching for information addressed by that response; parsing each representative query into terms; determining which of the terms are more likely to uniquely identify queries for that response among terms in representative queries for all the responses; forming a Boolean expression satisfied by a text query containing one of the terms determined to more likely uniquely identify that response, and another one of the terms; storing the Boolean expression in association with that response.

In accordance with another aspect of the present invention, there is provided a computer readable medium storing computer executable instructions that when executed by computing device, cause the computing device to index a plurality of responses for later retrieval and presentation to a user in response to a text query, using a method comprising: storing the plurality of responses, for each of the plurality of responses receiving at least one representative query for that response, the at least one representative query representing a query to be input by an end user searching for information addressed by that response; parsing each representative query into terms; determining which of the terms are more likely to uniquely identify queries for that response among terms in representative queries for all the responses; forming a Boolean expression satisfied by a text query containing one of the terms determined to more likely uniquely identify that response, and another one of the terms; storing the Boolean expression in association with that response.

In accordance with a further aspect of the present invention, there is provided a computing device comprising a processor, and computer readable memory, the computer readable memory storing: a plurality of responses for later retrieval and presentation to a user in response to queries, computer executable instructions, adapting the computing device, to for each of the plurality of responses, receiving at least one representative query for that response, the at least one representative query representing a query to be input by an end user searching for information addressed by that response; parsing each the at least one representative query into terms; determining which of the terms are more likely to uniquely identify queries for that response among terms in representative queries for all the responses; forming a Boolean expression satisfied by a text query containing one of the terms determined to more likely uniquely identify that response, and another one of the terms; storing the Boolean expression in association with that response.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
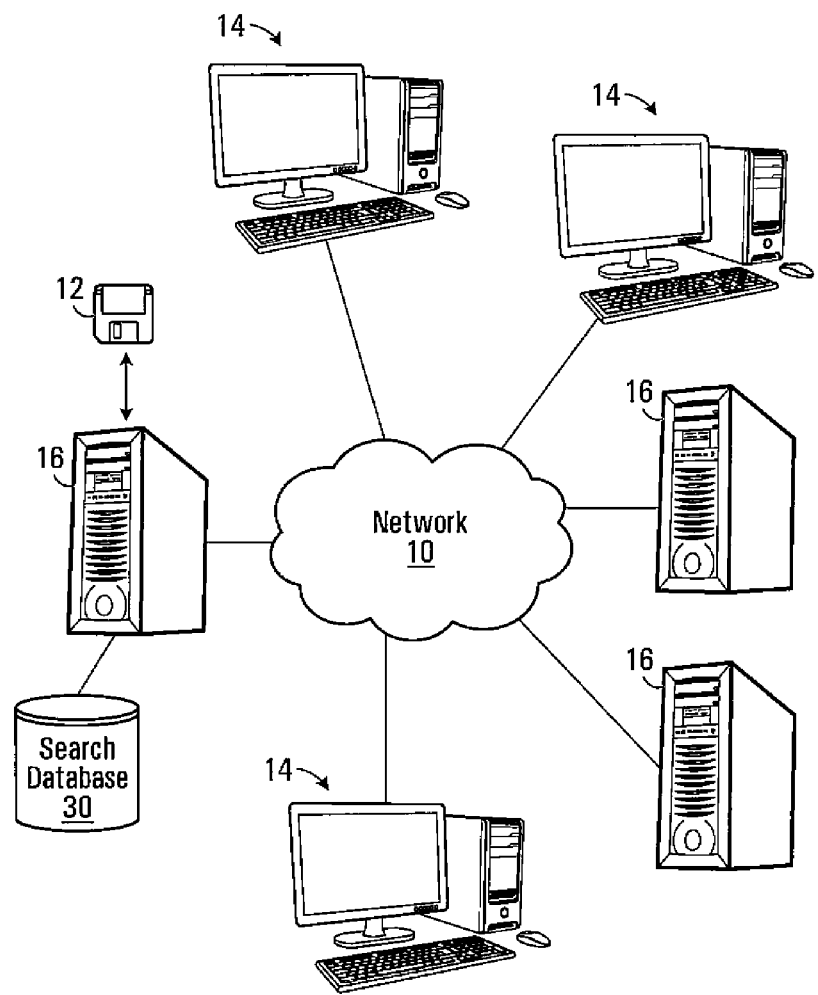
FIG. 1 illustrates a computer network and network interconnected server, operable to index information and provide search results, exemplary of an embodiment of the present invention.

FIG. 1 illustrates a computer network interconnected server 16. Server 16 which may be a conventional network server, that is configured and operates to query responses within an information base, largely as described in the '409 Patent, and in manners exemplary of embodiments of the present invention as detailed herein.

As illustrated, server 16 is in communication with a computer network 10 in communication with other computing devices such as end-user computing devices 14 and computer servers 18. Network 10 may be a packet switched data network coupled to server 16. So, network 10 could, for example, be an Internet protocol, X.25, IPX compliant or similar network.

Example end-user computing devices 14 are illustrated. Servers 18 are also illustrated. As will become apparent, end-user computing devices 14 are conventional network interconnected computers used to access data from network interconnected servers, such as servers 18 and server 16.

Example server 16 preferably includes a network interface physically connecting server 16 to data network 10, and a processor coupled to conventional computer memory. Example server 16 may further include input and output peripherals such as a keyboard, display and mouse. As well, server 16 may include a peripheral usable to load software exemplary of the present invention into its memory for execution from a software readable medium, such as medium 12.

As such, server 16 includes a conventional filesystem, typically controlled and administered by the operating system governing overall operation of server 16. This filesystem may host an information base in database 30, and search software exemplary of an embodiment of the present invention, as detailed below. In the illustrated embodiment, server 16 also includes hypertext transfer protocol ("HTTP") files; to provide end-users an interface to search data within database 30. Server 16 thus stores index information in the information base and provides search results to requesting computing devices, such as devices 14.

Figure 2:
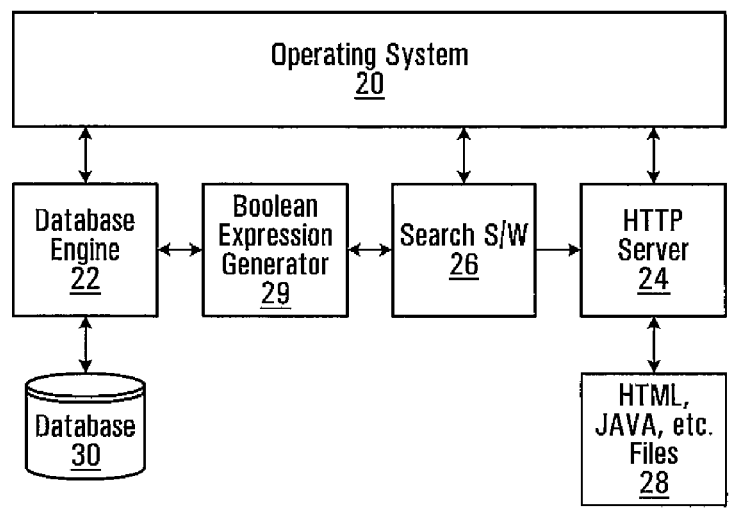
FIG. 2 is a functional block diagram of software stored and executing at the network server of FIG. 1.

FIG. 2 illustrates a functional block diagram of software components preferably implemented at server 16. As will be appreciated, software components embodying such functional blocks may be loaded from medium 12 (FIG. 1) and stored within persistent memory at server 16. As illustrated, software components preferably include operating system software 20; a database engine 22; an http server application 24; and search software 26, exemplary of embodiments of the present invention. Further, database 30 is again illustrated. Again database 30 is preferably stored within memory at server 16. As well data files 28 used by search software 26 and http server application 24 are illustrated.

Operating system software 20 may, for example, be a Linux operating system software; Microsoft NT, XP Vista, operating system software, or the like. Operating system software 20 preferably also includes a TCP/IP stack, allowing communication of server 16 with data network 10. Database engine 22 may be a conventional relational or object oriented database engine, such as Microsoft SQL Server, Oracle, DB2, Sybase, Pervasive or any other database engine known to those of ordinary skill in the art. Database engine 22 thus typically includes an interface for interaction with operating system software 20, and other application software, such as search software 26. Ultimately, database engine 22 is used to add, delete and modify records at database 30. HTTP server application 24 is preferably an Apache, Cold Fusion, Netscape or similar server application, also in communication with operating system software 20 and database engine 22. HTTP server application 24 allows server 16 to act as a conventional http server, and thus provide a plurality of HTTP pages for access by network interconnected computing devices. HTTP pages that make up these home pages may be implemented using one of the conventional web page languages such as hypertext mark-up language ("HTML"), Java, javascript or the like. These pages may be stored within files 28.

Search software 26 adapts server 16, in combination with database engine 22 and operating system software 20, and HTTP server application 24 to function as described in the '409 patent. Search software 26 may act as an interface between database engine 22 and HTTP server application 24 and may process requests made by interconnected computing devices. In this way, search software 26 may query, and update entries of database 30 in response to requests received over network 10, in response to interaction with presented web pages. Similarly, search software 26 may process the results of user queries, and present results to database 30, or to users by way of HTTP pages. Search software 26 may for example, be suitable CGI or Perl scripts; Java; Microsoft Visual Basic application, C/C++ applications; or similar applications created in conventional ways by those of ordinary skill in the art.

HTTP pages provided to computing devices 14 in communication with server 16 typically provide users at devices 14 access to a search tool and interface for searching information indexed at database 30. The interface may be stored as HTML or similar data in files 28. Conveniently, information seekers may make selections and provide information by clicking on icons and hyperlinks, and by entering data into information fields of the pages, presented at devices 14. As such, HTTP pages are typically designed and programmed by or on behalf of the operator or administrator of server 16. Conveniently, the HTTP pages may be varied as a server, like server 16, is used by various information or index providers.

Software components at server 16 further include an automated Boolean expression generator 29, used to generate Boolean expressions that index responses stored within database 30, in manners exemplary of embodiment of the present invention. Boolean expression generator 29 may for example, be formed using suitable CGI or Perl scripts; Java; Microsoft Visual Basic application, C/C++ applications; or similar applications created in conventional ways by those of ordinary skill in the art. Boolean expression generator 29 may interact with the remaining software components at device 16, including database engine 22, HTTP server 24, and search software 26.

Files 28, search software 26 and Boolean expression generator 29 may further define an administrator interface, not specifically detailed herein. The administrator interface may allow an administrator to populate database 30, and retrieve data representative of user queries and operate in conjunction with Boolean expression generator 29, as detailed below. The administrator interface may be accessed through network 10, by an appropriate computing device using an appropriate network address, administrator identifier and password.

The architecture of computing devices 14 (FIG. 1) is not specifically illustrated. Each of devices 14 (FIG. 1), however, may be any suitable network aware computing device in communication with data network 10 and capable of executing a suitable HTML browser or similar interface. Each computing device 14 is typically provided by an end-user and not by the operator of server 16. Computing-devices 14 may be conventional desktop computers including a processor, network interface, display, and memory. Computing devices 14 may access server 16 by way of data network 10. As such, each of devices 14 typically stores and execute network aware operating systems including protocol stacks, such as TCP/IP stack, and internet web browsers such as Microsoft Internet Explorer™, Mozila™, Safari™ or Opera™ browsers.

As noted, server 16 includes a database 30. Database 30 is preferably a relational database. As will become apparent, database 30 includes records representative of index data that may be considered the information base indexed within database 30. Database 30 may further store information representative of searches requested through server 16.

Figure 3:
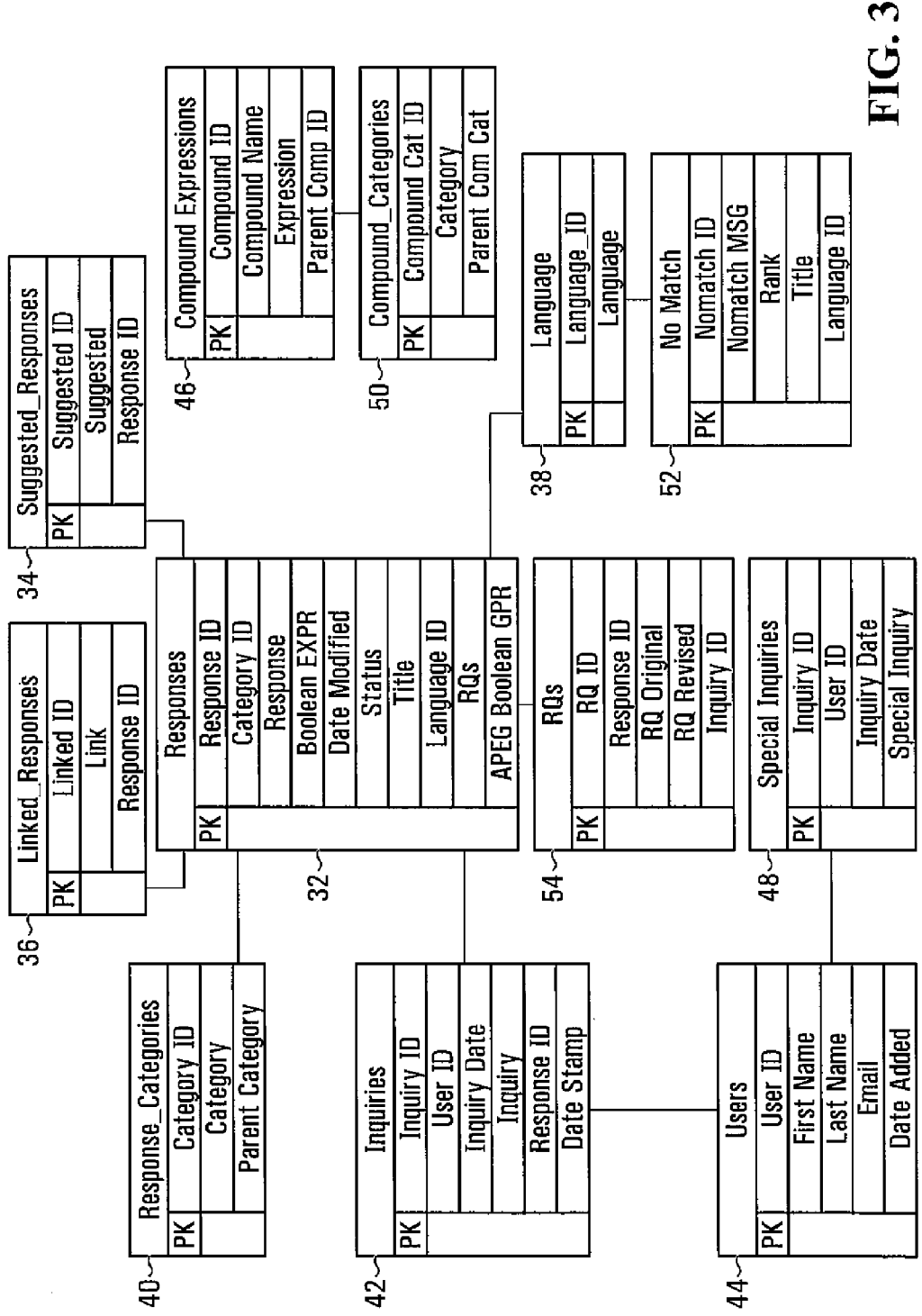
FIG. 3 is a diagram illustrating a database schema for a database used by the network server of FIG. 1.

A simplified example organization of database 30 is illustrated in the '409 patent. A simplified example organization of database 30 is illustrated in FIG. 3. As illustrated, example database 30 is organized as a plurality of tables. Specifically, database 30 includes responses table 32 (RESPONSES), suggested responses table 34 (SUGGESTED_RESPONSES); linked responses table 36 (LINKED_RESPONSES); languages table 38 (LANGUAGE); response categories table 40 (RESPONSE_CATEGORIES); inquiries table 42 (INQUIRIES); users table 44 (USERS); special inquiries table 46 (SPECIAL_INQUIRIES); compound expressions table 48 (COMPOUND_EXPRESSIONS); compound categories table 50 (COMPOUND_CATEGORIES); no match table 52 (NO_MATCH); and representative query (RQ) table 54.

As noted, the illustrated structure of database 30 is simplified. Depending on the nature of additional features of server 16 that are not detailed herein, database 30 may include many more tables. Illustrated fields may store text, integers, timestamps, or the like. Similarly, each illustrated table may include many more columns (or fields) than those detailed herein.

As illustrated, responses table 32 (RESPONSES) includes columns (and therefore fields) for storing data representative of a response identifier (RESPONSE_ID-int); response category (CATEGORY_ID-int); response title (TITLE-varchar (50)); a response (or response link) (RESPONSE-varchar (8000)); a Boolean expression used to locate the response (BOOLEAN_EXPR-varchar (5000)); a date modified (DATE_MODIFIED-timestamp); language of response (LANGUAGE_ID-int) and a status (STATUS-int). Response table 32 stores responses presented to users of server 16 in response to inquiries to locate specific information.

Each category of response is particularized in table 40. Table 40 includes a numerical identifier of each category (CATEGORY_ID-int); and a text identifier of each category in field (CATEGORY-varchar(250)). Each category entry further includes a field identifying a link to a parent category (PARENT_CATEGORY-int). Table 40 allows an administrator to categorize responses in table 32, and organize (view, sort, etc.) them hierarchically allowing available categories of responses to be presented as a tree.

Suggested response table 34 (SUGGESTED_RESPONSES) includes columns (and therefore fields) for storing data representative of a related response (RESONSE_ID) as contained in table 32; and a suggested response (SUGGESTED_ID) identifying a further response that a user seeking a response in table 32 may be interested in. As such, for each response in table 32, one or more suggested additional responses, believed to be of interest to a seeker of the response in table 32 may be stored.

Linked response table 36 (LINKED_RESPONSES) includes columns (and therefore fields) for storing data representative of responses linked to a particular response identified in response id field (RESONSE_ID-int) contained in table 32; in a linked response field (LINKED_ID-int) identifying a further response that a user seeking a response in table 32 will be presented along with a sought response. Again, for each response indexed in table 32, multiple linked responses may exist in table 36. In this way, multiple responses may be combined and presented in combination.

Table 38 identifies in full text (in field LANGUAGE-varchar(50)) the language of a particular text (as, for example stored in tables 32 and 52), numerically identified in language id field (LANGUAGE_ID-int).

Table 54 identifies representative queries input by an administrator and foreseeably addressed by an associated response. Each RQ is identified by an RQ identifier (RQ_ID). The associated response is also identified (RESPONSE_ID). The RQ as input is stored in RQ_ORIGINAL. As well, the RQ as stemmed/revised, as discussed below is stored in RQ_REVISED.

User queries and user identities may optionally be stored within tables 42, 44 and 46.

Specifically, information about known users may be stored in table 44. Fields representing the users first name (FIRSTNAME-varchar(75)); lastname (LASTNAME-varchar(50)); e-mail address (EMAIL-varchar(50)); date added (DATE_ADDED-timestamp).

Inquiries table 42 may store records of inquiries processed by server 16. Each record within inquiries table 42 stores a field identifying the user (USER_ID)-int) of a query; a field identifying the date of the query (INQUIRY_DATE-timestamp); the query (INQUIRY-varchar(1000)); the provided response (RESPONSE_ID-int).

Table 46 stores non-standard inquiries of users. For each non-standard query, an identifier of the query (SP_INQUIRY-ID-int), the user id (USER_ID-int), inquiry date (SP_INQUIRY_DATE-timestamp) and inquiry (SPECIAL_INQUIRY-varchar(4000)) are stored.

Compound expressions table 48 further stores compound Boolean expressions that may be used in determining matches to inquiries, in manners exemplary of an embodiment of the present invention, as detailed below. Each compound expression is identified numerically (COMPOUND_ID-int); by name (COMPOUND_NAME-varchar(50)) and category (COMPOUND_CAT_ID-int). Expression field (EXPRESSION-varchar(4000)) stores a Boolean expression that is to be equated with the compound expression, when identified by name.

Compound expressions may be placed in categories, which in turn may be identified and linked in table 50 including category id (COMPOUND_CAT_ID-int); text category (COMPOUND_CAT-varchar(250)); and a field identifying the parent compound category (PARENT_COMP_CAT), allowing these to be arranged hierarchically by an administrator.

Compound expressions may be used to simplify expressions for multiple terms. For example, queries involving price or cost may include numerous synonymous terms, such as "dollar", "price", "cost", and the like. A composite Boolean expression ("dollar" OR "price" OR "cost" OR "money") may be stored within the EXPRESSION field of compound expression table 48. The compound expression may be identified by a name stored in the associated NAME field in table 48. For example, the name "PRICE" (or any other name) unique to table 48 may be attributed to the compound expression Of note, response table 32 includes a table entry for each indexed response. Each table entry includes a field RESPONSE—containing full text (or a link thereto) to the full text of an indexed response. As well, each entry of table 32 includes an entry, BOOLEAN_EXPR, identifying a Boolean expression that should be satisfied by an expected query for the response contained within the entry of table 32. Expressions contained in BOOLEAN_EXPR for the various table entries in table 32 are applied to identify matching responses.

Of additional note, each response entry includes an associated TITLE field that contains text succinctly identifying the nature of the response that has been indexed. The TITLE field may contain a conventional title or abstract, or any other succinct, relevant summary of the contents of the RESPONSE field of the entry.

Figure 4:
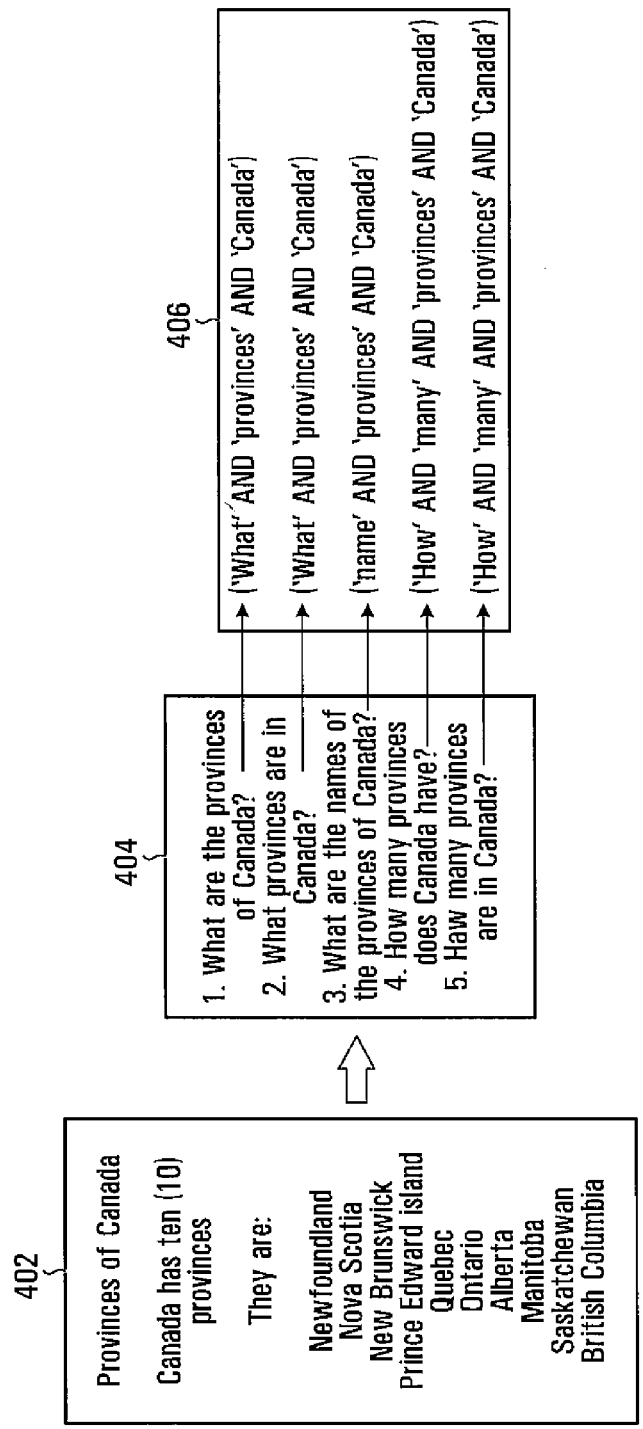
FIG. 4 illustrates an exemplary response, associated contemplated queries and associated Boolean expressions, as manually generated.
Figure 5A:
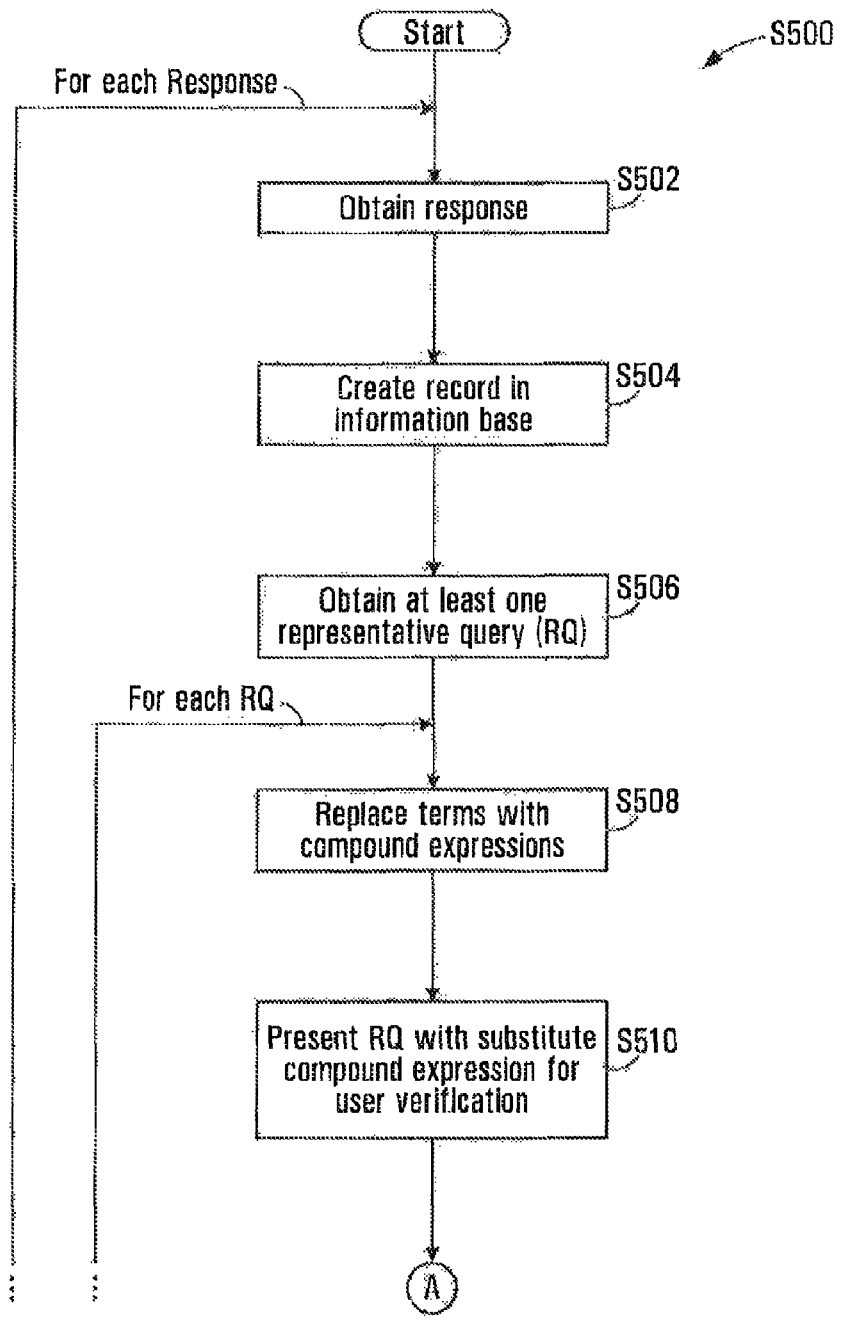
FIGS. 5A to 5E illustrate exemplary steps performed at the server of FIG. 1 in automated indexing of responses.
Figure 5B:
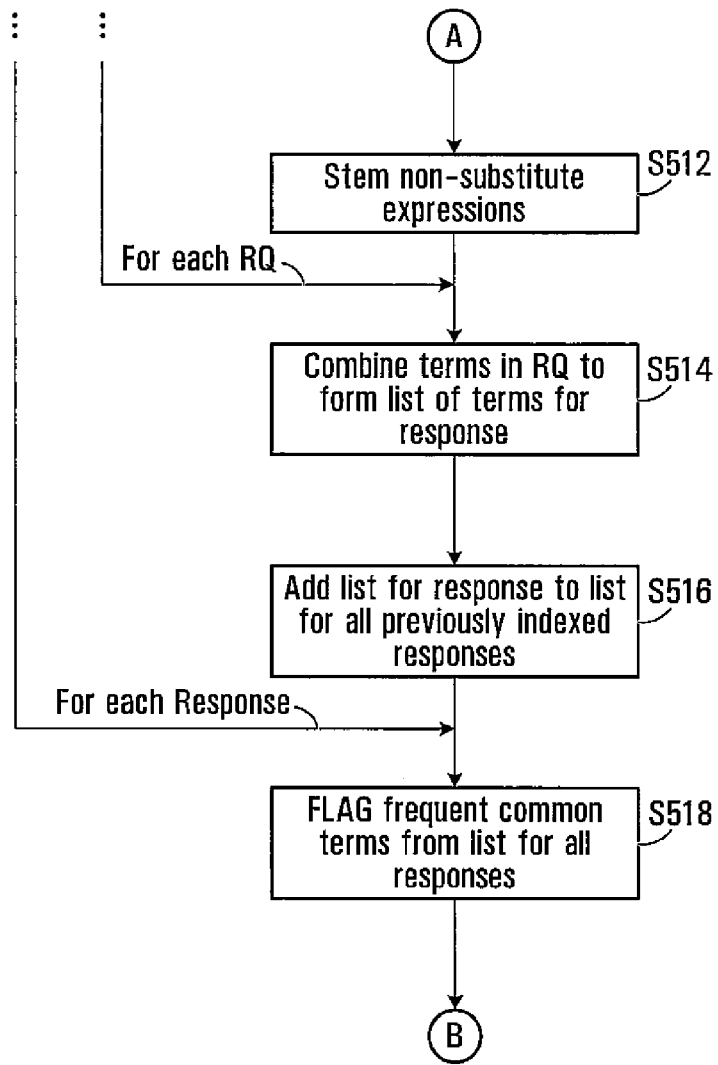
Figure 5C:
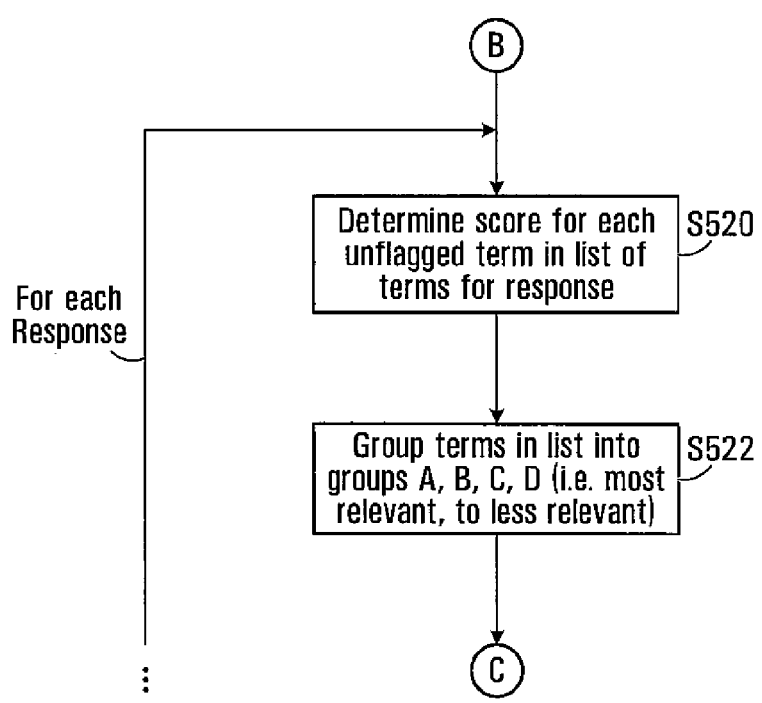
Figure 5D:
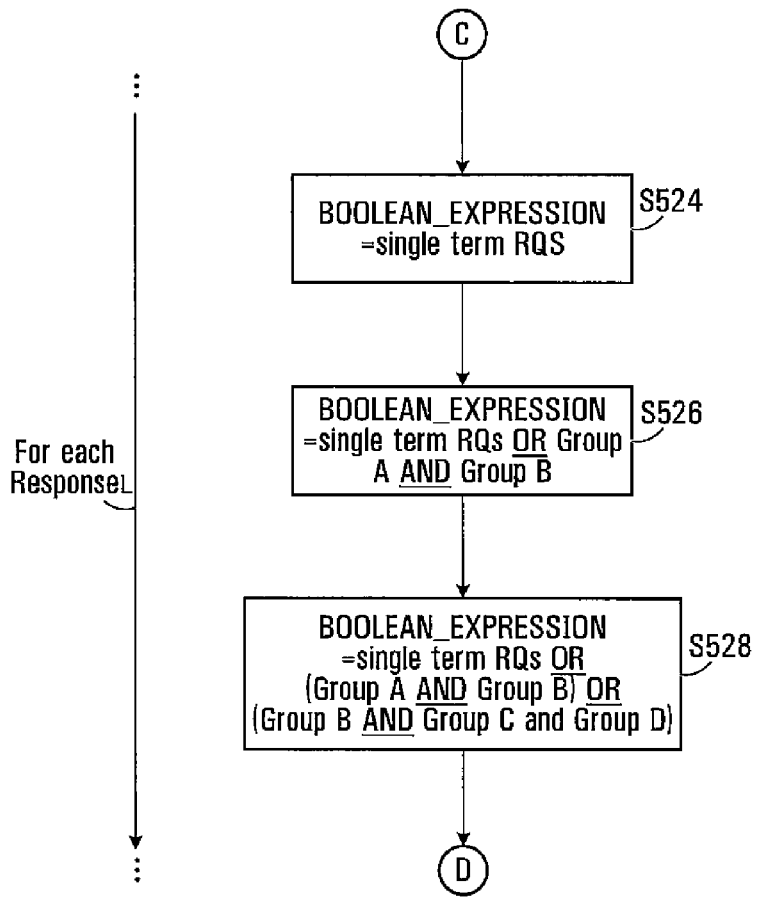
Figure 5E:
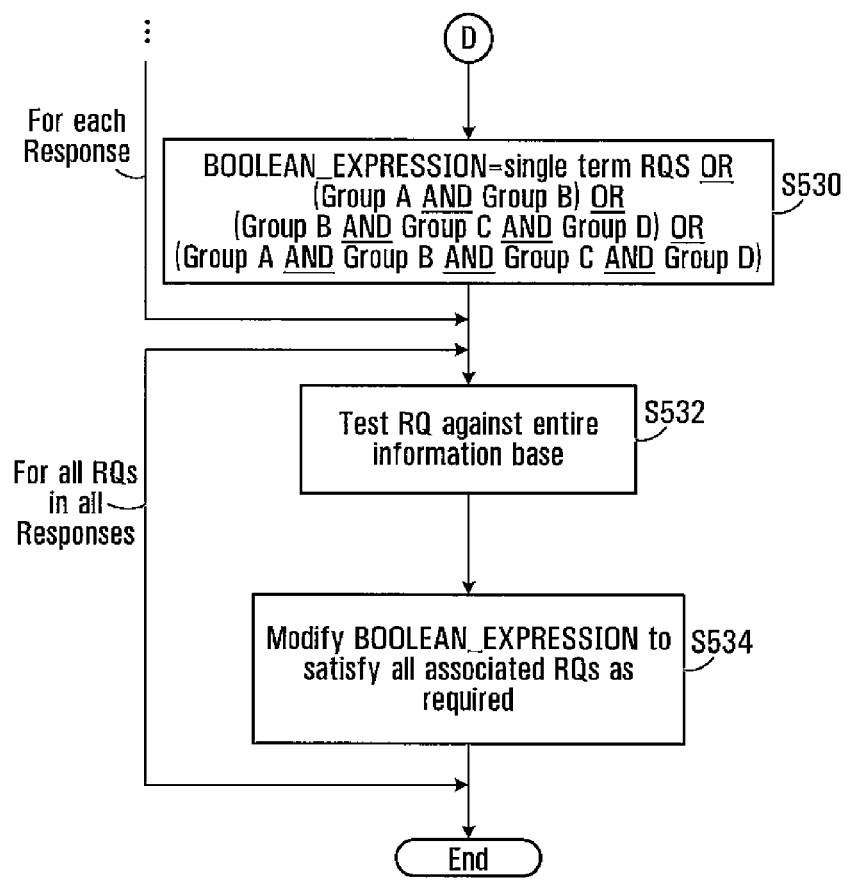

To better appreciate use of server 16 and database 30, FIG. 4 illustrates an example response 402 to be indexed for searching by server 16. Specifically, example response 402 may be data in any computer understandable form. For example, response 402 could be text; audio; an image; a multimedia file; an HTML page. Response 402 could alternatively be one or more links to other responses. For example, response 402 could simply be a hypertext link to information available somewhere on network 10, (for example at one of servers 18). Response 402 may be associated with a plurality of representative queries (RQs) 404, which are anticipated to be satisfied by response 402. That is, response 402 when presented by a computer in a human understandable form (e.g. natural language) provides a satisfactory answer to a user presenting any one of RQs 404.

RQs are preferably plain text queries. For illustration only, illustrated response 402 is a text representation of Canadian provinces, and an introduction to these provinces. Typical RQs 404 for which response 402 is satisfactory are also depicted and may include 1. "What are the provinces of Canada?"; 2. "What provinces are in Canada?"; 3. "What are the names of the provinces of Canada?"; 4. "How many provinces does Canada have?"; and 5. "How many provinces are in Canada?.

RQs 404 in turn may be used to form one or more Boolean expressions 406, containing one or more terms satisfied by the queries. The Boolean expressions may be manually formulated by noting the important words/phrases in each query. For example, queries 1.and 2. satisfy the Boolean expression ('What' AND 'provinces' AND 'canada') and query 3. satisfies the Boolean expression ('name*' AND 'provinces' AND 'canada'); queries 4 and 5 both satisfies the Boolean expression ('How' AND 'many' AND 'provinces' AND 'Canada'.

So, queries 1, 2, 3, 4, and 5 may be represented by a single, multi-term Boolean expression: ('What' AND 'provinces' AND 'Canada') OR ('What' AND 'provinces' AND 'Canada') OR ('name*' AND 'provinces' AND 'Canada') OR ('How' AND 'many' AND 'provinces' AND 'Canada') OR ('How' AND 'many' AND 'provinces' AND 'Canada').

At the same time, many questions about Canada's provinces, however, are not answered by response 402. For example, queries like 6. "What is the largest province in Canada?"; and 7. "What is the eastern-most province in Canada?"; and the like are not answered by response 402, and are therefore not illustrated among RQs 404.

As such, these queries could be explicitly excluded by Boolean expression 406. For reasons that will become apparent, if responses specifically addressing queries 6. and 7. are stored and indexed within table 32, explicit exclusions of the identified Boolean expressions may be unnecessary.

Boolean expression 406, once appropriately formulated is stored within database 30, in the BOOLEAN_EXPR field of table 32 storing response 402. The actual response in a computer understandable format is also stored within the associated record in table 32. RQs 404, themselves, need not be, and typically are not, stored. Similar Boolean expressions are developed for other responses indexed by database 30, and stored in table 32. Formulation of a suitable queries and resulting Boolean expressions for each response can be performed manually. Each record within table 32 stores a response and associated Boolean expression.

Preferably, an administrator also considers which other responses a user seeking a particular (i.e. primary) response within table 32 may be interested in. Suggested response table 34 may be populated by the administrator with identifiers of such other suggested responses. Each other suggested response is identified in table 34 by a suggested response identifier (in the SUGGESTED_ID field), and linked to a primary response in table 32. So for the example response 402, suggested responses may answer queries such as "What are the capitals of the provinces?"; "What are the territories of Canada?", and the like.

Additional responses may also be incorporated by reference in a particular response. Such additional responses may be presented in their entirety along with a sought response in table 32. References to the additional responses are stored in table 34 (in SUGGESTED field), with a reference to a primary response in table 32 (stored in the REPSONSE_ID field).

In the preferred embodiment, database 30 is populated with Boolean expressions representative of natural language queries. As such, the interface provided to the end-user preferably indicates that a natural language query is expected. Of course, Boolean expressions could be formulated for other queries having a syntax other than natural language.

Server 16 accordingly is particularly well suited for indexing a single network site, operated by a single operator, having related/suggested responses. The operator may further tailor the contents of the web site to logically separate the content of responses, bearing in mind RQs to be answered by each response.

Nevertheless, as may be appreciated from the above simplified example, formulating suitable Boolean expressions for the responses in the information base is not trivial. The task becomes more complex as the number of responses and associated representative queries in the information base of database 30 grows. Each Boolean expression should best satisfy its representative queries, without satisfying similar queries, best addressed by other responses in database 30. As such, Boolean expressions will be interdependent, and dependent on the number and collective responses in database 30.

Accordingly, Boolean expressions have historical been manually formulated and verified by an administrator with a solid grasp of Boolean logic. Further, the collection of Boolean expressions for the entirety of database 30 needs to be maintained, as database 30 is updated. This, of course may be time consuming. If not done properly, the quality of matches presented deteriorates over time.

Accordingly, exemplary of embodiments of the present invention, server 16 further stores an automated Boolean expression generator 29 that may be periodically executed by an administrator to form suitable Boolean expressions for the multiple responses in the information base.

Steps performed by Boolean expression generator are depicted in FIGS. 5A-5E.

In particular, steps performed by Boolean expression generator 29 in updating an information base of responses in database 30 to include one or more new responses, are detailed. All administrator input may be input at server 16, or elsewhere, by an operator familiar with the response.

Specifically, the response and other input may be input through the administrator interface, by an administrator in block S502. Accordingly, for each new response, a record 32 is added to database 30 in block S504. Next, RQs for the new response are collected from the administrator. As noted, RQs are contemplated natural language queries for which answers are believed to be provided in associated response. In block S506, the collection RQs for each response is collected from the administrator and stored.

For illustration purposes assume one such new response details the functionality of server 16, hosting an information base, and operating software for searching and indexing the information base, made available under the trademark IntelliResponse™.

For this example response, RQs may for example be
"Is IntelliResponse a search engine?"
"How is Intelliresponse different than search?"
"Are you like SearchEngineX?"
"Search"
"Does IntelliResponse return multiple answers?"
"What is the difference between you and SearchEngineX?"

Next in block S508, terms in the RQs may be translated into expressions already familiar to software 26. In particular, any term within any RQ that is a species of a previously stored compound expression in database 30, may be replaced. This may be done by Boolean expression generator 29 querying table 48 of database 30 for compound expressions including (or satisfied by) individual terms of an RQ.

Optionally, the translated RQs may be presented to an administrator/operator, and the administrator/operator may confirm or reject any substitutions in block S510.

So, the above RQs may be translated into a mixture of terms (e.g. individual words) and compound expressions as follows:
"Is {IR-Product} a search engine?"
"How is {IR-Product} {Comparison-Different} than search?"
"Are you like SearchEngineX?"
"Search"
"search engine"
"Does {IR-Product} return {Multiple} answers?"
"What is the {Comparison-Different} between you and SearchEngineX?"
where {IR-Product}, {Comparison-Different}, {Multiple} represent compound expressions stored in table 48.

Next in block S512, any remaining non-substituted terms having a length in excess of a threshold may be stemmed, and extended with wildcard characters. As will be appreciated, stemming is the process for reducing inflected (or sometimes derived) words to their stem, base or root form—generally a written word form. The stem need not be identical to the morphological root of the word; it is usually sufficient that related words map to the same stem, even if this stem is not in itself a valid root. Stemming is often referred to as conflation. Numerous stemming algorithms are known, and include Porter, Lovins, Paice/Husk and Dawson stemming algorithms. Extending a stemmed term is performed so that all terms beginning with the stem, but possibly having further characters appended, may be matched. For example, extending the stem "search" (written as "search*") will match on "search", "searching", "searches", etc.
"Is {IR-Product} a search*engine*?"
"How is {IR-Product} {Comparison-Different} than search*?"
"Are you like SearchEngineX*?"
"search*engine*"
"Search*"
"Does {IR-Product} return*{Multiple} answer*?"
"What is the {Comparison-Different} between you and SearchEngineX*?"

Next, the collection of terms in each RQ may be combined into a list in block S514. As well, common terms may be separately identified. Common terms may include selected pronouns, articles, verbs, and the like. Example common terms include "the", "a", "is", "than", "does". Common terms may be stored in database 30 (not specifically illustrated). For each example representative query, after substitutions and stemming, the list may take the following form:
[engine*, {IR-Product}, search*engine*, (a,is)]
[{Comparison-Different}, {IR-Product}, search*, than, (how, is)]
[(search*)]
[search*, engine*]
[SearchEngineX*, (are, like, you)]
[answer*, {IR-Product}, return*{Multiple}, (does)]
[{Comparison-Different}, SearchEngineX*, (and, between, is, the, what, you)]

Common terms are identified by the parentheses ( ). Of note, each presented list has been re-ordered alphabetically. This, of course, is purely optional.

Once the multiple lists for the multiple RQs have been created, they may be consolidated in block S514 into a single list of terms. Additionally, the frequency of each term is collected in block S514.

The resulting consolidated list for the multiple example RQs may take the form:
[{answer*,1}, {{Comparison-Different},2}, {engine*,2}, {SearchEngineX*, 2}, {{IR-Product,},3},{{Multiple}, 1}, {return*,1}, {search*,4}, {than,1}, ({a,1}, {are,1}, {and, 1}, {between, 1}, {does, 1}, {how, 1}, {is, 1}, {like, 1}, {the, 1}, {what, 1}, {you, 2})]

Now, in block S516, the list for the multiple example RQs for the response is added to a list for all terms for the entire information base within database 30. The frequency of each term within the information base, and within RQs for each response is also maintained.

An example list of terms for the entire information base in database 30 may have the form
[(2009,1}, {act, 1} {Canada, 1} {answer*, 5}, ... {Wrong/Error},2}, {work, 16}, {written*, 1}, {yellow*,1}, ({a, 22}, {about, 10}, {and, 4}, {are, 41} ... {what, 72}, {who, 17}, {you, 48}, {your, 20})]

Term frequency lists are maintained for each individual response (as a sum of the term list for each RQ in that response) and for the entire set of responses (as a sum of the term lists in RQs for each response) in database 30. These term frequency lists may be updated each time Boolean expressions are recomputed.

As will become apparent, the purpose of the list of terms and frequencies is to allow Boolean expression generator 29 to analyse terms used in RQs and use the analysis to construct Boolean expressions that may be used to identify a particular response. In the depicted embodiment, terms and their frequencies within RQs are used to formulate Boolean sub-expressions. Each Boolean sub-expression may be expressed as the union (OR) of one or more Boolean elements. Each Boolean element, in turn, is the intersection (AND) of one or more sub-expressions, expected in queries for an associated response. The various Boolean sub-expressions may further be combined to form a Boolean expression stored within database 30.

Frequently occurring common terms within the list may be removed from the list in block S518. Frequency may be assessed with reference to the frequency of the terms, and the number of RQs from which the entire information base, including all indexed responses, has been constructed. In the example embodiment, common terms that appear with a high frequency in the RQs may be removed. For example, any common term occurring with a frequency greater than (Total number of RQs used to form the information base)/24 may be removed.

In the depicted embodiment, RQs for each response are stored in table 54. As depicted in FIG. 3, each RQ as input (RQ_ORIGINAL), and each RQ as further processed (i.e. RQ_REVISED) is stored within table 54.

Next, for each remaining term in the list of terms for each individual response, its significance in identifying that particular response that is being sought is determined. More specifically in block S520, a score for each remaining term in that response is calculated. The score indicates the significance/importance of that term in identifying that particular response. As scores are calculated for each term for each response, the same term may have different scores for different responses. For any response, the higher the score, the more likely use of that term in a query will clearly identify that response within the information base, including the new responses and previously indexed responses.

In an example embodiment, the score for each term may be calculated as follows:

$$\text{Term score} = (1000/\text{len} + \text{freq1} * 250) * \text{freq2},$$

where
- len=length (in number of terms) of the shortest RQ for a particular response in which the term appears;
- freq1=frequency of the term for the response/total number of terms for the response; and
- freq2=minimum of (1, frequency of the term for the response/sqrt(frequency of the term for the entire information base)).

Using this calculation, terms appearing in short RQs are assigned a higher value (i.e. 1000/len will have a relatively high value); likewise frequently appearing terms in the collection of RQs for a particular response are assigned a higher score (i.e. freq1 will be high). Finally, terms appearing infrequently in RQs for other responses in the information base will be assigned a high value (i.e. frequency of the term for the response/sqrt(frequency of the term for the entire information base) will be high).

Once a term score has been determined, and is assigned to each remaining term in all RQs for a particular response, the terms for that particular response may be grouped into groups of terms representing terms most (or more) likely and least (or less) likely to uniquely indentify queries for the particular response among all indexed responses in block S522.

In the example embodiment, terms associated with each response are grouped into four separate groups. Specifically, GroupA may contain terms with scores in excess of 500; GroupB may contain terms with scores between 200 and 500; Group C may contain terms having scores between 100 and 200; and Group D may contain terms with scores less than 100.

Put another way, terms in groupA are more likely to uniquely indentify an RQ for the response among RQs for all responses, than terms in group B; terms group B are more likely to uniquely indentify an RQ for the response among RQs for all indexed responses, than terms in group C; and terms in group C are more likely to do so than terms in group D. A person of ordinary skill will readily appreciate that more or fewer groups could be used.

For the example response above, the calculated scores may be (answer)=96.9

(engin*)=216.7

(SearchEngineX*)=283.3

(search*)=756.2

({Multiple})=143.5

({Comparison-Different})=312.4

(return*)=104.6

(than)=165.0

(a)=43.3

({IR-Product})=97.6

(and)=71.4

(between)=142.9

(like)=189.4

Now, using this analysis, Boolean elements and sub-expressions that attempt to uniquely identify a particular response among all responses within the information base in database 30 may be formed.

As noted, each Boolean element includes one or more terms that are ANDed together. A composite Boolean expression for a response takes the form of the union (OR) of the multiple Boolean elements. Each Boolean sub-expression within at least one of the Boolean elements should therefore be satisfied by a query for a response that addresses the query. At the same time, however, any query should ideally only return a single response (although this may not always be the case). Moreover, however, Boolean sub-expressions are to be formed from RQs and not from all possible queries. Consequently, constructing Boolean sub-expressions requires some compromise and heuristics.

For example, a Boolean element formed from the logical AND of all terms in a one or two word RQ is an excellent choice for a Boolean element/sub-expression. Likewise, a Boolean element formed from the logical AND of all terms in a query may similarly be an excellent choice for a Boolean sub-expression (although such a Boolean element may be unnecessarily long, as detailed below).

On the other hand, a single highly unique term found in an RQ having three, four or more terms, by itself, may not be a good candidate for a Boolean sub-expression, as actual queries (different from RQs) for multiple responses could be formulated using this unique term.

In the example embodiment, Boolean elements that are believed to uniquely identify a particular response from all responses may be constructed, as follows:

1. OR together any and all terms within 1 or 2 word representative queries in block S524

For the above example representative queries–BOOLEAN_ELEMENT(S)=(search*) OR ((search*) AND (engine*))

2. Boolean elements representing the combination for any term in Group A AND any term in Group B;

For the above example representative queries, the Boolean elements–

BOOLEAN_ELEMENT(S)=(search*) AND ({Comparison-Different} OR engine*OR SearchEngineX*)

However, if a Group A or Group B is empty, no Boolean elements corresponding to Group A AND any term in Group B are formed.

3. Boolean combination for any term in Groups B AND any term in Group C AND any term in Group D in block S528

So for the above example representative queries–

```
BOOLEAN_ELEMENT(S)={Comparison-Different}
    OR engine OR SearchEngineX*) AND ({Mul-
    tiple} OR return*OR than OR between OR like)
    AND (answer*OR {IR-Product} OR a OR and)
```

Again, if a Group B is empty no Boolean elements corresponding to Group B AND any term in Group C AND any term in Group D are formed.

Now, the choice of BOOLEAN_ELEMENT(S) above is somewhat arbitrary. A person of ordinary skill through experimentation may readily conclude that other BOOLEAN_ELEMENTS are equally well, or even better suited to uniquely identifying a particular response.

As detailed in the '409 patent, and further below, a quality of match is ultimately calculated each time a query satisfies a Boolean expression. The quality of match depends on the number of terms matched within a Boolean expression. As such, other Boolean elements may be added to the Boolean expression to refine the quality of match returned by any particular query.

In the example embodiment, Boolean elements for any term in Group A AND any term in Group B AND any term in Group C AND any term in Group D are formed in block S530 to be added to the Boolean Expression.

```
BOOLEAN_ELEMENT(S)=(search*) AND {Com-
    parison-Different} OR engine OR Search-
    EngineX*) AND ({Multiple} OR return*OR
    than OR between OR like) AND (answer*OR
    {IR-Product} OR a OR and)
```

Of note, these BOOLEAN ELEMENT(S) are also satisfied by expressions that satisfy Boolean elements formed from terms in Group A AND Group B, as well as Boolean elements formed from terms Group B AND any term in Group C AND any term in Group D.

Once all Boolean elements (or sub-expressions) are formed, the Boolean expression for the response may be formed as the union of the Boolean elements/sub-expressions. That is, the resulting Boolean expression may be formed in S532, as

```
BOOLEAN_EXPRESSION=(search*) OR ((search*)
    AND (engine*)) OR (search*) AND ({Comparison-Different} OR
    engine*OR SearchEngineX*) OR {Comparison-Different} OR engine OR Search-
    EngineX*) AND ({Multiple} OR return* OR
    than OR between OR like) AND (answer* OR
    {IR-Product} OR a OR and) OR (search*) AND {Comparison-Different} OR engine
    OR SearchEngineX*) AND ({Multiple} OR
    return* OR than OR between OR like) AND
    (answer*OR {IR-Product} OR a OR and)
```

Once the Boolean expression of block S532 has been formed, all the RQs for the response associated with the Boolean expression may be tested against the entire information base. That is, in block S534, RQs for the new response are input into search software 26 to assess whether or not the RQ returns the associated and desired response. This is repeated for all RQs for the response. If any one of the RQs does not return the response, the ANDed list of terms for the RQ are merely appended and ORd with the Boolean expression formed in block S532. The Boolean expression is replaced accordingly in block S536.

So, using the above example, in the event that that the RQ "Does IntelliResponse return multiple answers?" Fails to return the associated response, the newly formed Boolean expression may be updated to include the Boolean element,

```
BOOLEAN_ELEMENT={Multiple} AND {IR-Prod-
    uct} AND (return*) AND (does OR answer*)
```

Of note, common terms (does) and (answer*) are ORed not ANDed, as neither of these terms is significant.

The resulting BOOLEAN_EXPRESSION then takes the form,

```
BOOLEAN_EXPRESSION=(search*) OR ((search*)
    AND (engine*)) OR (search*) AND ({Comparison-Different} OR engine*
    OR SearchEngineX*) OR {Comparison-Different} OR engine OR Search-
    EngineX*) AND ({Multiple} OR return* OR
    than OR between OR like) AND (answer* OR
    {IR-Product} OR a OR and) OR (search*) AND {Comparison-Different} OR engine
    OR SearchEngineX*) AND ({Multiple} OR
    return* OR than OR between OR like) AND (an-
    swer* OR {IR-Product} OR a OR and) OR {Multiple} AND {IR-Product} AND (return*) AND
    (does OR answer*)
```

As will be appreciated, each response to be added to information base in database 30 may be added by Boolean expression generator 29, repeating blocks S502-S536. As blocks S502-S536 may take some time to perform, they may be repeated by an operator each time a batch of new responses is added to the information base.

After added responses have been indexed, using Boolean expression generator 29, an end user at a computing device interconnected with network 10 may contact server 16 containing an index of responses and Boolean expressions satisfied by possible queries, formed as detailed above.

Figure 6:
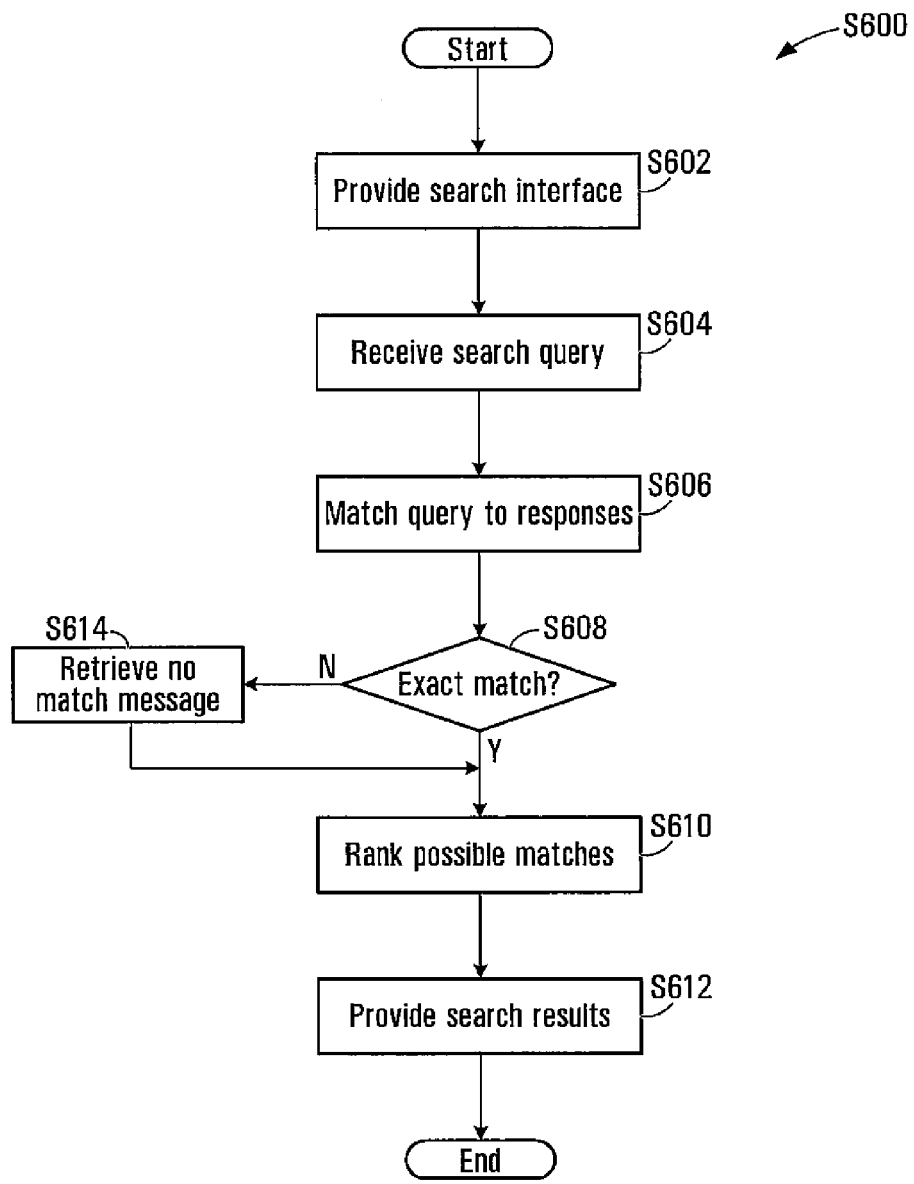
FIGS. 6 and 7 illustrate exemplary steps performed at the server of FIG. 1 in processing a query.

In response steps S600 and onward illustrated in FIG. 6 are performed at server 16. Optionally, prior to the performance of steps S600 the user's identity may be prompted or retrieved. Specifically, sufficient information used to populate or retrieve a record in table 44 may be obtained from the user. That is, the user could be prompted for a name, a persistent state object ("cookie") could be retrieved from the user's computer, or the like. As will become apparent, knowledge of the user's identity although advantageous, is not required.

In any event once, server 16 is used to allow user queries, server 16 provides a search interface, typically in the form of an HTML page to the contacting computing device 14 in step S602. The HTML page includes a search field. This search field may be populated with a desired query by the user. The interface may further provide the user with suitable instructions for entering an appropriate query.

Next, a query is received at server 16 in step S604. Optionally, particulars about the query may be logged in inquiries table 42. In response to receiving the query, software 26 parses words within the query (QUERY) and applies Boolean expressions stored within the BOOLEAN_EXPR field of table 32 for all (or selected) responses stored in table 32. In parsing, extra spaces and punctuation in the query are preferably removed/ignored. Unlike typical search techniques, submitted queries are not used to form Boolean expressions used to search responses. Instead, stored Boolean expressions for indexed responses are applied against submitted queries.

Figure 7:
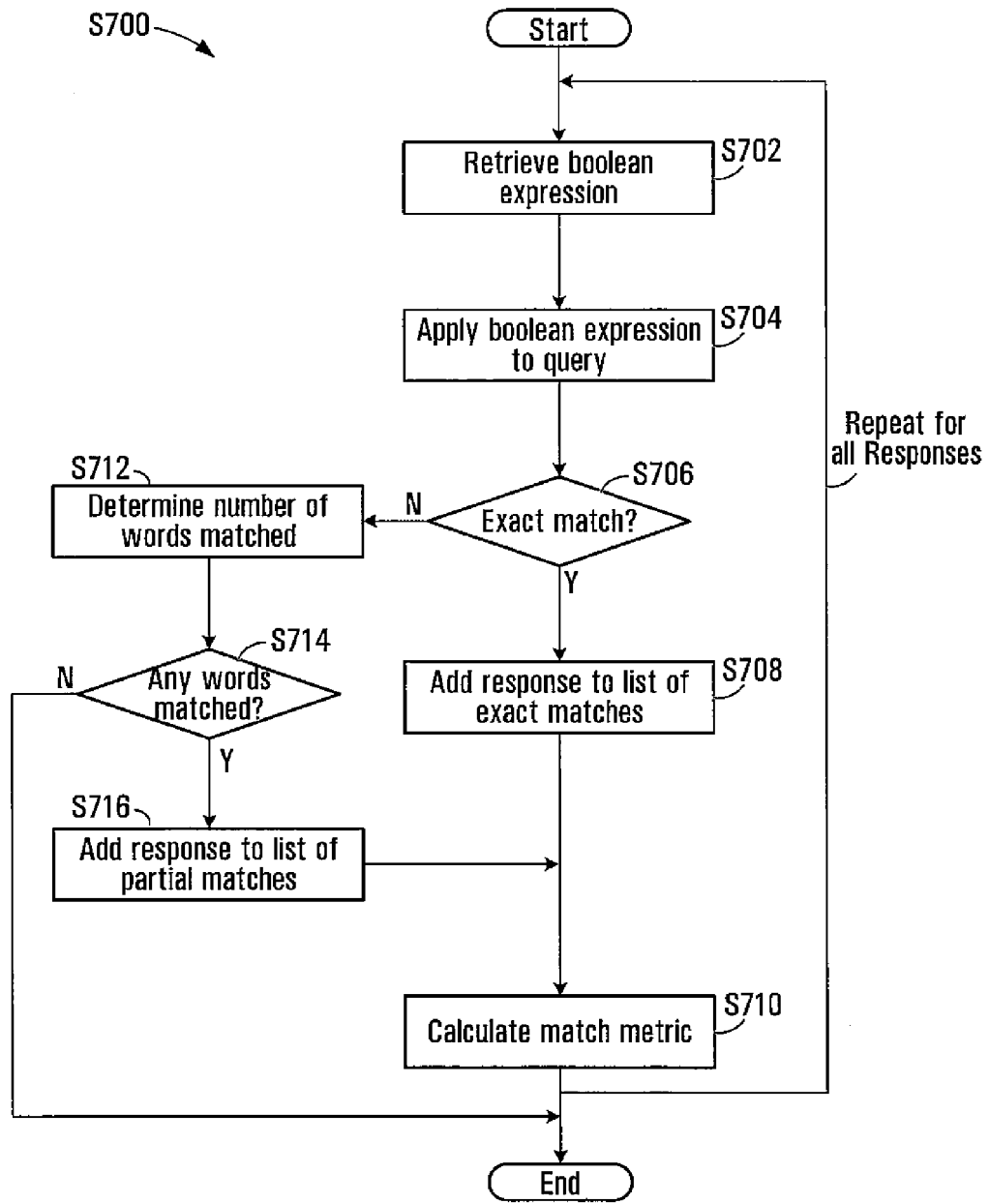

So, for each Boolean expression in table 32, steps S700 of FIG. 7 are performed in step S606. That is, in step S702 the Boolean expression stored in each BOOLEAN_EXPR field of table 32 is applied to the received query, and is evaluated. In the example embodiment, each term of a stored Boolean expression is separately by a Boolean operator and separately evaluated. Strings are encased with single quotes, and matched without regard to case. Logical operators AND, OR, NOT, XOR and the like may separate terms and may be interpreted. Similarly, common wild cards such as "*", "?" and the like may be used as part of the expressions. Common Boolean terms may be represented as single terms. Compound terms forming part of a Boolean expression may be identified with a special character such as square brackets. Compound terms are defined in tables 50 and 52 and separately evaluated as detailed below.

As will be appreciated, many Boolean expressions are equivalent. As noted, Boolean expressions may be reduced to a canonical form, having multiple Boolean elements ORed together. That is, any Boolean expression is reduced to a format: (Boolean element1) OR (Boolean element2) OR (Boolean element3) OR (Boolean element4).

In this format, the Boolean expression will be satisfied if any one of the multiple sub-expressions is satisfied. Each of the ORed sub-expressions, in turn includes a single term or multiple terms that are ANDed together. Each term could, of course be a NOT term. In this way any Boolean expression may be canonically represented.

Conveniently, in this canonical format, a degree of match for each sub-expression, and for the entire Boolean expression may easily be calculated in a number of ways.

For example, as each Boolean element (i.e. Boolean element1, Boolean element2 . . . ) includes only terms that are ANDed together, it is possible to calculate a degree of match for each Boolean element, as the ratio of the total number of terms in the Boolean element that are satisfied by the query, to the total number of terms of the Boolean element in the query. Thus the degree of match for any matched sub-expression would be one (1).

So for example, if Boolean element1=(A AND B AND C), a first query including words A, B and C would satisfy Boolean element1. A second query including only words A and B would not satisfy Boolean element1. A degree of match equal to ⅔ could be calculated for Boolean element1 as applied to this second query.

At the same time, in the event a sub-expression is satisfied by the query, a quality of match for that sub-expression may be calculated. Again, a quality of match may be calculated in any number of ways. For example, the quality of match may be calculated as the ratio of the number of terms in a sub-expression, divided by the total number of words in the query. So a five (5) word query including the words A, B, and C would satisfy Boolean element1 and a quality of match equal to ⅗ could be calculated.

So, in the event a Boolean expression is satisfied by the words of the submitted query, as determined in step S706, an identifier for the response associated with the satisfied Boolean expression is maintained in step S708. As well, one or more metrics identifying the quality of the match may be calculated in step S610.

Numerous other ways of determining metric(s) indicative of a degree of match will be appreciated by those of ordinary skill in the art.

This metric(s) may be calculated in any number of ways. As noted the quality of match for the Boolean expression may be calculated, by calculating the quality of match for any of the matched Boolean elements of the Boolean expression, and choosing the largest of these as calculated. For the example Boolean expressions 406 (FIG. 4), question 1. "How many provinces are in Canada", would produce an exact match and a quality of match score of ⅘, calculated as above. A question of "How many provinces in Canada are east of Saskatchewan" would yield an exact match with a quality of match word score of ⅘. The largest of these calculated word scores may be considered the quality of match metric for the Boolean expression as applied to the particular query.

Optionally, additional metrics indicative of the quality of match may be calculated. For example, a further "relevant" word score, may be calculated by calculating a quality of match once common words stored in a common word dictionary (not specifically illustrated) are excluded. For example words like "the", "in", "an", etc. in the query may be excluded for the purposes of calculating a quality of match metric. The dictionary of common words may be manually formed depending on the responses stored within table 34. Other metrics indicative of the quality of match could be calculated in any number of ways. For example, each term in a Boolean expression could be associated with a numerical weight; proximity of matched words in the query could be taken into account. Other ways of calculating a metric indicative of a quality of match may be readily appreciated by those of ordinary skill in the art.

In the event a Boolean expression does not result in an exact match, as determined in step S706, the number of matched words within the Boolean expression may be determined in step S712. If at least one word is matched to a term in any sub-expression, as determined in step S714, the response may be noted as a partially matched response in a list of partially matched responses in step S716. A metric indicative of the degree of match may be calculated for the Boolean expression in step S710. For example, a degree of match, as detailed above, may be calculated for each sub-expression of the Boolean expression. The largest of these may be stored as the degree of match for the query. Thus, an identifier of the partially satisfied response and the ratio of matched terms to total terms may also be stored in step S716. Steps S702 and onward are repeated for each response within database 30.

Once all exactly and partially matched responses are determined in step S606 (i.e. steps S700), the best exact match, if any (as determined in step S608) is determined in step S510. The best exact match may be the exact match determined in steps S700 having the highest metric [e.g. word count and/or relevant word count, etc.]. In step S610, other exact response may be ranked. Similarly, partial matches may be ranked using the calculated degree of match metric. In step S612, the best exactly matched response is obtained from the RESPONSE field of table 32 and presented. As well, any linked responses (i.e. data in the RESPONSE field) as identified in table 36 are also presented. Preferably, the best matched exact response is unique. If it is not, all exact matches with equal degrees of matches may be displayed. As well as titles (or links) of stored associated and suggested responses stored in tables 34 and 36 are presented. These may, for example, be presented in a drop down box, or the like. Similarly, if server 16 indexes other types of data in table 32, (e.g. sound, images, etc.), the data associated with the best matched response may be presented in human understandable form. Preferably, not all partially matched responses will be presented. Instead only a defined number of responses or responses whose other metrics exceed defined scores need be presented. Title of these may also be presented in a drop-down box.

Results, including the highest ranked exact response, possible alternate responses, and responses associated with the highest ranked response are preferably presented to a computing device of the querying user in step S610. Results may be presented as an HTML page, or the like.

In the event no exact match is found, as determined in step S608, a message as stored in NO_MATCH table 52 indicating that no exact match has been found is retrieved in step S614. Partial matches, if any, are still sorted in step S610. A result indicating no exact match and a list of partial matches is presented in step S612.

Optionally, in the event no exact match is determined, the user may be prompted to rephrase his query or submit this query as a special query for manual processing. This may be accomplished by presenting the user with an HTML form requesting submission of the query as a special query for later handling by the administrators of server 16. If the user chooses to do so, the query for which no exact match is obtained may be stored in table 52. At a later time, an administrator of server 16 may analyze the query, and if desirable update responses and/or Boolean queries stored in table 32 to address the special query. If a userid is associated with the special query, a conventional reply e-mail addressing the special query may be sent to user.

After a single query is processed, steps S600 and onward may be repeated and additional queries may be processed.

Additionally, once a response has been identified, the relevance or quality of the response may be further assessed by matching the query to the contents of actual response for which associated Boolean expression have been satisfied by the query, in manners exemplary of embodiments of the present invention.

In processing Boolean expressions in step S704, pre-defined compound Boolean expressions stored in tables 48 and 50 will also be used. Compound Boolean expressions typically include several Boolean terms, and are identified with a single moniker. Compound Boolean expressions may reduce the size of the stored Boolean expressions, and simplify formulation of Boolean expressions. For example, queries involving price or cost may include numerous synonymous terms, such as DOLLAR, PRICE, COST, and the like. A composite Boolean expression (DOLLAR OR PRICE OR COST OR MONEY) may be stored within the EXPRESSION field of compound expression table 48. The compound expression may be identified by a name stored in the associated NAME field in table 48. For example, the name PRICE (or any other name) unique to table 48 may be attributed to the compound expression. In evaluating expressions in steps S600 (FIG. 6), compound expressions may be identified using a particular identifier. For example, square brackets may identify a compound expression. As Boolean expressions in table 32 are parsed, compound Boolean expressions are resolved with reference to compound expression table 48. Conveniently, the meaning of compound expressions may be loaded into memory, and need not be retrieved from database 30 with every use. Compound expressions may be replaced prior to considering a stored Boolean expression in canonical form, as detailed above.

As well, optionally for any one query, not all responses (and associated Boolean expressions) need be applied in steps S700. Instead, for example, only Boolean expressions for responses in a specific category or categories (as stored in the CATEGORY_ID field of a response record in table 32) need be tested. So, for example, if server 16 were used to process queries about an intranet site, categories of responses for any particular query might be limited depending on how the particular query was submitted. As a further example, in the event server 16 hosted a general site, having many topics, responses against which a particular query is tested, could be limited to a particular topic derived from the HTML page that the user is viewing when the query is initiated. Optionally, a further table may be stored in database 30 and contain a relation between categories stored in the CATEGORY_ID field of records in table 32, and categories relevant to searches originating with a particular page. That is, categories stored in tables 32 and 40 may be organized to facilitate creation of content. Accordingly, a table storing a correlation between tables 32 and 40 and categories that should be tested for any particular query may be stored.

As will be appreciated, while the organization of hardware, software and data have been explicitly illustrated, a person skilled in the art will appreciate that the invention may be embodied in a large number of ways. For example, software could be formed using any number of languages, components and the like. The interface need not be provided in HTML. Instead the interface could be provided using Java, XML, or the like. Database 30 could be replaced with an object oriented structure. Queries need not be processed over a network, but could be processed at a single, suitably adapted, machine.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A computer implemented method of indexing a plurality of responses in an information base for later retrieval and presentation to a user in response to queries, said method comprising, at at least one computing device:

storing said plurality of responses, for each of said plurality of responses receiving at least one representative query for that response, said at least one representative query representing a query to be input by an end user searching for information addressed by that response;

parsing each said at least one representative query into terms;

assigning a score to each of said terms, said score indicating a likelihood of a term uniquely identifying its associated response among representative queries for said plurality of responses in said information base, said score for each of said terms based on at least one of (i) number of terms in the representative query from which it is parsed;

(ii) frequency of said term amongst terms in the representative queries for its associated response; and (iii) frequency of said term amongst terms in the representative queries for the responses in remainder of said information base;

based on said score for each of said terms, determining which of said terms are more likely to uniquely identify queries for that response among terms in representative queries for all said responses and grouping said terms into at least two groups with terms in one of said groups determined to more likely uniquely identify that response among representative queries for all said responses and terms in any remaining group less likely to uniquely identify that response among representative queries for all said responses;

generating a Boolean expression satisfied by a text query containing any term in a one word representative query for that response or a text query containing one of said terms in said group determined to more likely uniquely identify that response based on said score for each of said terms, and another one of said terms in a group determined less likely to uniquely identify that response, for later use in indexing that response;

storing said Boolean expression in association with that response.

2. The method of claim 1, wherein each of said responses comprises terms, and wherein terms in said at least one representative query for a response do not necessarily include terms in that response.

3. The method of claim 1, further comprising testing to determine if each of said at least one representative query for that response satisfies said Boolean expression for that response, and if each of said at least one representative query does not satisfy said Boolean expression for that response, modifying said Boolean expression so that each of said at least one representative query satisfies said new Boolean expression.

4. The method of claim 1, wherein said generating further comprises modifying said Boolean expression to be further satisfied by a text query containing two terms of any two word representative query for that response.

5. The method of claim 1, wherein said grouping comprises grouping said terms into first, second, third and fourth groups of terms, with terms in the first group more likely to uniquely identify representative queries for that response among terms in representative queries for all said responses, than terms in said second group; with terms in the second group more likely to uniquely identify representative queries for that response among terms in representative queries for all said responses, than terms in the third group; with terms in the third group more likely to uniquely identify representative queries for that response among terms in representative queries for all said responses, than terms in the fourth group.

6. The method of claim 5, wherein said Boolean expression is satisfied by a text query containing at least one of said terms in said first group and at least one term in said second group.

7. The method of claim 6, wherein said generating further comprises modifying said Boolean expression to be further satisfied by a text query containing one of said terms in said second group and two of said terms in said third and fourth groups.

8. The method of claim 7, wherein said generating further comprises modifying said Boolean expression to be satisfied by a text query containing one of said terms in said first group, and three of said terms in said second, third and fourth groups.

9. The method of claim 7, wherein said generating further comprises modifying said Boolean expression to be further satisfied by a text query containing one of said terms in said second group, one of said terms in said third group, and one of said terms in said fourth groups, and one of said terms in said fourth group.

10. The method of claim 6, wherein said generating further comprises modifying said Boolean expression to be further satisfied by a text query containing one of said terms in said second group, one of said terms in said third group, and one of said terms in said fourth groups.

11. The method of claim 1, wherein said score is assigned a high value inversely proportion to the length of the shortest representative query from which the term is parsed.

12. The method of claim 1, wherein a score is assigned to have a high value for terms appearing frequently in all of said at least one representative query for its associated response.

13. The method of claim 1, wherein a score for a term is assigned a high value for those of said terms appearing relatively infrequently in representative queries for responses other than that particular response.

14. The method of claim 1, further comprising storing said representative queries.

15. A persistent computer readable medium storing computer executable instructions that when executed by computing device, cause said computing device to index a plurality of responses for later retrieval and presentation to a user in response to a text query, using a method comprising:

storing said plurality of responses, for each of said plurality of responses receiving at least one representative query for that response, said at least one representative query representing a query to be input by an end user searching for information addressed by that response;

parsing each said at least one representative query into terms;

assigning a score to each of said terms, said score indicating a likelihood of a term uniquely identifying its associated response among representative queries for said plurality of responses in said information base, said score for each of said terms based on at least one of (i) number of terms in the representative query from which it is parsed;

(ii) frequency of said term amongst terms in the representative queries for its associated response; and (iii) frequency of said term amongst terms in the representative queries for the responses in remainder of said information base;

based on said score for each of said terms, determining which of said terms are more likely to uniquely identify queries for that response among terms in representative queries for all said responses and grouping said terms into at least two groups with terms in one of said groups determined to more likely uniquely identify that response among representative queries for all said responses and terms in any remaining group less likely to uniquely identify that response among representative queries for all said responses;

generating a Boolean expression satisfied by a text query containing any term in a one word representative query for that response or a text query containing one of said terms in said group determined to more likely uniquely identify that response based on said score for each of said terms, and another one of said terms in a group determined less likely to uniquely identify that response, for later use in indexing that response;

storing said Boolean expression in association with that response.

16. A computing device comprising a processor, and computer readable memory, said computer readable memory storing:

a plurality of responses for later retrieval and presentation to a user in response to queries, computer executable instructions, adapting said computing device, to for each of said plurality of responses, receiving at least one representative query for that response, said at least one representative query representing a query to be input by an end user searching for information addressed by that response;

parsing each said at least one representative query into terms;

assigning a score to each of said terms, said score indicating a likelihood of a term uniquely identifying its associated response among representative queries for said plurality of responses in said information base, said score for each of said terms based on at least one of
  (i) number of terms in the representative query from which it is parsed;
  (ii) frequency of said term amongst terms in the representative queries for its associated response; and
  (iii) frequency of said term amongst terms in the representative queries for the responses in remainder of said information base;
based on said score for each of said terms, determining which of said terms are more likely to uniquely identify queries for that response among terms in representative queries for all said responses and grouping said terms into at least two groups with terms in one of said groups determined to more likely uniquely identify that response among representative queries for all said responses and terms in any remaining group less likely to uniquely identify that response among representative queries for all said responses;
generating a Boolean expression satisfied by a text query containing any term in a one word representative query for that response or a text query containing one of said terms in said group determined to more likely uniquely identify that response based on said score for each of said terms, and another one of said terms in a group determined less likely to uniquely identify that response, for later use in indexing that response;
storing said Boolean expression in association with that response.

17. A computer implemented method of indexing a plurality of responses in an information base for later retrieval and presentation to a user in response to queries, said method comprising, at at least one computing device:
  storing said plurality of responses,
  for each of said plurality of responses
    receiving at least one representative query for that response, said at least one representative query representing a query to be input by an end user searching for information addressed by that response;
    parsing each said at least one representative query into terms;
    assigning a score to each of said terms, said score indicating a likelihood of a term uniquely identifying its associated response among representative queries for said plurality of responses in said information base, said score for each of said terms based on at least one of
      (i) number of terms in the representative query from which it is parsed;
      (ii) frequency of said term amongst terms in the representative queries for its associated response; and
      (iii) frequency of said term amongst terms in the representative queries for the responses in remainder of said information base;
    based on said score for each of said terms, determining which of said terms are more likely to uniquely identify queries for that response among terms in representative queries for all said responses and grouping said terms into at least two groups with terms in one of said groups determined to more likely uniquely identify that response among representative queries for all said responses and terms in any remaining group less likely to uniquely identify that response among representative queries for all said responses;
  generating a Boolean expression satisfied by a text query containing two terms of any two word representative query for that response or a text query containing one of said terms in said group determined to more likely uniquely identify that response based on said score for each of said terms, and another one of said terms in a group determined less likely to uniquely identify that response, for later use in indexing that response;
  storing said Boolean expression in association with that response.

* * * * *